(12) United States Patent
Hutchings

(10) Patent No.: US 10,815,835 B2
(45) Date of Patent: Oct. 27, 2020

(54) APPARATUS AND METHOD FOR ENERGY STORAGE

(71) Applicant: Futurebay Limited, Manchester (GB)

(72) Inventor: Adrian Charles Hutchings, Manchester (GB)

(73) Assignee: FUTUREBAY LIMITED, Manchester (GB)

( * ) Notice: Subject to any disclaimer, the term of this patent is extended or adjusted under 35 U.S.C. 154(b) by 626 days.

(21) Appl. No.: 15/549,430

(22) PCT Filed: Feb. 11, 2016

(86) PCT No.: PCT/GB2016/050327
§ 371 (c)(1),
(2) Date: Aug. 8, 2017

(87) PCT Pub. No.: WO2016/128754
PCT Pub. Date: Aug. 18, 2016

(65) Prior Publication Data
US 2018/0016948 A1  Jan. 18, 2018

(30) Foreign Application Priority Data

Feb. 11, 2015  (GB) .................................. 1502249.4

(51) Int. Cl.
*F01K 23/04* (2006.01)
*F01K 3/12* (2006.01)
(Continued)

(52) U.S. Cl.
CPC ................ *F01K 23/04* (2013.01); *F01K 3/12* (2013.01); *F01K 17/005* (2013.01); *F01K 25/10* (2013.01);
(Continued)

(58) Field of Classification Search
CPC ..... F01K 3/12; F01K 3/14; F01K 3/16; F01K 17/005; F01K 23/00; F01K 23/02;
(Continued)

(56) References Cited

U.S. PATENT DOCUMENTS

| | | | | |
|---|---|---|---|---|
| 3,022,235 A | * | 2/1962 | Brown | ................... G05D 16/18 376/210 |
| 4,198,827 A | * | 4/1980 | Terry | ...................... F01K 25/00 60/649 |

(Continued)

FOREIGN PATENT DOCUMENTS

| | | | | |
|---|---|---|---|---|
| DE | 102011086374 A1 | * | 5/2013 | ............... F01K 7/16 |
| DE | 102011086374 A1 | | 5/2013 | |

(Continued)

OTHER PUBLICATIONS

India Office Action, Indian Application Ser. No. 201737031582, dated Mar. 23, 2020; pp. 1-6.

(Continued)

*Primary Examiner* — Mark A Laurenzi
*Assistant Examiner* — Mickey H France
(74) *Attorney, Agent, or Firm* — Taft Stettinius & Hollister LLP; Stephen F. Rost

(57) ABSTRACT

An energy storage apparatus includes a first circuit containing a first phase change material, a second circuit containing a second phase change material, and a heat pump having a cold side heat exchanger thermally coupled to the first circuit and a hot side heat exchanger thermally coupled to the second circuit. The apparatus is operable in a charging mode, a storage mode, and a discharge mode. In the charging mode the heat pump is energized to cool the first phase change material and heat the second phase change material. In the storage mode the first phase change material is stored in a first storage vessel and the second phase change material (Continued)

is stored as a pressurized vapor in a second storage vessel. In the discharge mode vaporized first phase change material is expanded by a first expander, or the vaporized second phase change material is expanded by a second expander.

20 Claims, 2 Drawing Sheets

(51) Int. Cl.
| | |
|---|---|
| F01K 25/10 | (2006.01) |
| F01K 17/00 | (2006.01) |
| F28D 15/02 | (2006.01) |
| F24S 20/20 | (2018.01) |
| F01K 3/00 | (2006.01) |
| F01K 13/00 | (2006.01) |

(52) U.S. Cl.
CPC .............. *F28D 15/02* (2013.01); *F01K 3/006* (2013.01); *F01K 13/006* (2013.01); *F24S 20/20* (2018.05); *Y02E 20/16* (2013.01)

(58) Field of Classification Search
CPC .......... F01K 23/04; F01K 23/08; F01K 25/06; F01K 25/08; F28D 20/00–028; Y02E 60/14–145; Y02E 20/16
USPC ......... 60/614–618, 645, 657, 659, 662, 663, 60/667, 670, 671, 676, 678, 655
See application file for complete search history.

(56) References Cited

U.S. PATENT DOCUMENTS

| | | | | | |
|---|---|---|---|---|---|
| 4,220,009 | A | * | 9/1980 | Wenzel | F02C 1/00 48/191 |
| 4,417,446 | A | | 11/1983 | Nakamoto et al. | |
| 4,475,343 | A | * | 10/1984 | Dibelius | C10J 3/54 60/648 |
| 4,555,905 | A | * | 12/1985 | Endou | F01K 21/005 60/659 |
| 5,809,791 | A | * | 9/1998 | Stewart, III | F01K 25/08 60/655 |
| 9,038,390 | B1 | * | 5/2015 | Kreuger | F03G 6/065 60/655 |
| 9,726,441 | B2 | * | 8/2017 | Reissner | F28F 27/003 |
| 9,989,278 | B1 | * | 6/2018 | Kreuger | F24S 10/25 |
| 2007/0101989 | A1 | * | 5/2007 | Strathman | F01K 13/00 126/636 |
| 2008/0022683 | A1 | * | 1/2008 | Ohler | F03D 9/255 60/641.8 |
| 2008/0022713 | A1 | * | 1/2008 | Jacobi | F24F 5/0017 62/434 |
| 2009/0250189 | A1 | * | 10/2009 | Soukhojak | F24H 7/02 165/10 |
| 2010/0252232 | A1 | * | 10/2010 | Reich | F24F 5/0035 165/48.1 |
| 2010/0281889 | A1 | * | 11/2010 | Reich | F24F 5/0017 62/66 |
| 2011/0252796 | A1 | * | 10/2011 | Burkhart | F01K 27/00 60/641.2 |
| 2012/0125002 | A1 | * | 5/2012 | Lehar | F01K 23/04 60/645 |
| 2012/0168111 | A1 | * | 7/2012 | Soukhojak | F28D 20/023 165/10 |
| 2012/0272650 | A1 | * | 11/2012 | Ogata | F01K 13/006 60/676 |
| 2013/0019598 | A1 | * | 1/2013 | Tamaura | F22B 1/006 60/641.8 |
| 2013/0056170 | A1 | * | 3/2013 | Klemencic | F03G 6/067 165/10 |
| 2013/0111903 | A1 | * | 5/2013 | Stiesdal | F01K 3/004 60/659 |
| 2013/0125546 | A1 | * | 5/2013 | Barmeier | F01K 13/006 60/643 |
| 2013/0205776 | A1 | * | 8/2013 | Yin | F02M 26/32 60/615 |
| 2013/0299123 | A1 | * | 11/2013 | Matula | F24T 10/20 165/45 |
| 2014/0096520 | A1 | * | 4/2014 | Paya Diaz | F01K 11/02 60/641.7 |
| 2014/0103661 | A1 | * | 4/2014 | Kacludis | F01K 9/02 290/54 |
| 2014/0208750 | A1 | * | 7/2014 | Vermeersch | F01K 13/02 60/646 |
| 2014/0298813 | A1 | | 10/2014 | Brunhuber et al. | |
| 2015/0000248 | A1 | * | 1/2015 | del Omo | F01K 23/10 60/39.182 |
| 2015/0114019 | A1 | * | 4/2015 | Van Gysel | F24D 17/001 62/238.7 |
| 2015/0136351 | A1 | | 5/2015 | Reznik et al. | |
| 2015/0218969 | A1 | * | 8/2015 | Reznik | F01K 15/00 60/651 |
| 2015/0330261 | A1 | * | 11/2015 | Held | F01D 11/003 60/326 |
| 2016/0377303 | A1 | * | 12/2016 | Staffend | F28D 15/02 165/45 |
| 2017/0248040 | A1 | * | 8/2017 | Verma | F01K 23/04 |
| 2018/0016948 | A1 | * | 1/2018 | Hutchings | F01K 25/10 |
| 2018/0187627 | A1 | * | 7/2018 | Apte | F02C 6/16 |
| 2018/0328235 | A1 | * | 11/2018 | Eliyahu | F01K 23/08 |
| 2018/0372337 | A1 | * | 12/2018 | Walker | F01K 3/18 |
| 2019/0003750 | A1 | * | 1/2019 | Ahmed | F25B 27/00 |
| 2019/0161366 | A1 | * | 5/2019 | Al-Azazmeh | C02F 1/441 |

FOREIGN PATENT DOCUMENTS

| | | | |
|---|---|---|---|
| EP | 2653670 A1 | 10/2013 | |
| GB | 191414826 A * | 8/1915 | ............... F22B 1/04 |
| JP | S61237804 A | 10/1986 | |
| JP | 09303111 A | 11/1997 | |

OTHER PUBLICATIONS

European Patent Office. International Preliminary Report on Patentability issued in PCT/GB2016/050327, dated Aug. 15, 2017. 7 Pages. Geneva, Switzerland.

Search Report, United Kingdom Intellectual Property Office, dated Jul. 17, 2015, 3 pages.

International Search Report & Written Opinion, European Patent Office, dated May 24, 2016, 12 pages.

* cited by examiner

APPARATUS AND METHOD FOR ENERGY STORAGE

This application is a U.S. national stage application under 35 U.S.C. § 371 of PCT International Application Serial No. PCT/GB2016/050327 which has an international filing date of Feb. 11, 2016, designates the United States of America, and claims the benefit of GB Application No, 1502249,4, which was filed on Feb. 11, 2015, The disclosures of each of these prior applications are hereby expressly incorporated by reference in their entirety.

This invention relates to an apparatus and method for energy storage, and, more particularly, to an apparatus and method for energy storage that utilises thermal energy storage.

BACKGROUND

In the field of electricity generation, there is often a mismatch between supply of electricity and the demand for the electricity at any given time.

As an example, it is often more efficient to continuously run power stations as opposed to intermittently running them to match demand. However, given that demand for electrical energy continuously fluctuates (particularly at night when demand can drop significantly) supply of electrical power from the power station may frequently exceed the level of demand. As a further example, renewable power generators often produce fluctuating levels of energy due to the unpredictable and changeable nature of renewable sources (e.g. wind power, wave power, solar intensity etc.) and this time dependent output seldom matches the demand. Thus, there is a need for energy storage systems that may be used to store energy produced by electricity generators (e.g. when demand for such energy is low), and subsequently be capable of converting stored energy back into electrical energy (e.g. when demand increases).

Several energy storage systems are known and these include systems that convert electrical energy into thermal energy which is subsequently stored for later use.

Energy storage systems may preferably be constructed and operated at low costs and further preferably incur low energy losses so that the energy discharged after storage is not significantly lower than the original energy inputted into the system It is an object of certain embodiments of the present invention to provide a commercially viable energy storage apparatus.

BRIEF SUMMARY OF THE DISCLOSURE

In accordance with an aspect of the present invention, there is provided an energy storage apparatus comprising:
a first fluidic circuit containing a first phase change material, the first fluidic circuit including a first storage vessel and a first expander;
a second fluidic circuit containing, a second phase change material having a boiling point greater than a boiling point of the first phase change material, the second fluidic circuit including a second storage vessel and a second expander; and
a heat pump having a cold side heat exchanger thermally coupled to the first fluidic circuit and a hot side heat exchanger thermally coupled to the second fluidic circuit,
the apparatus being operable in a charging mode, a storage mode following the charging mode, and a discharge mode following the storage mode;
wherein in the charging mode the heat pump is energised to cool the first phase change material and heat the second phase change material;
in the storage mode the first phase change material is stored in the first storage vessel and the second phase change material is stored as a pressurised vapour in the second storage vessel; and
in the discharge mode vaporised first phase change material is expanded by the first expander, and/or the vaporised second phase change material is expanded by the second expander.

The first fluidic circuit may be arranged such that in the discharge mode and/or storage mode the first phase change material may be heated by ambient thermal energy (or other auxiliary heat sources). The first fluidic circuit may be arranged such that in the discharge mode and/or storage mode the first phase change material may be vaporised by ambient thermal energy (or other auxiliary heat sources).

The apparatus may further comprise a thermal coupling arranged to transfer heat from expanded second phase change material to the first phase change material and cause the first phase change material to vaporise or be further heated.

In certain embodiments, in the charging mode, the heat pump may be energised to condense the first phase change material. In certain embodiments, the storage mode, the condensed first phase change material may be stored as a liquid or a solid.

The first phase change material may have a boiling point less than the ambient heat or other heat source used to heat it. In certain embodiments, the first phase change material may have a boiling point less than 50° C. at 1 bar, less than 40° C. at 1 bar, less than 0° C. at 1 bar, or less than −10° C. at 1 bar.

The second phase change material may have a boiling point less than the ambient heat or other heat source used to heat it. In certain embodiments, the second phase change material may have a boiling point less than 50° C. at 1 bar, or less than 40° C. at 1 bar. Additionally or alternatively, the second phase change material may have a boiling point greater than 20° C. at 1 bar, greater than 25° C. at 1 bar, or greater than 30° C. at 1 bar.

In certain embodiments, the first storage vessel may be configured to change volume so as to maintain the first phase change material at a substantially constant pressure.

Additionally or alternatively, the second storage vessel is configured to change volume so as to maintain the second phase change material at a substantially constant pressure.

In certain embodiments, one or each of the first expander and second expander comprises an expander generator.

In accordance with an aspect of the present invention, there is provided a method of operating an energy storage apparatus, comprising:
providing an energy storage apparatus according to any preceding claim;
operating the energy storage apparatus in a charging mode by energising the heat pump to cool the first phase change material and heat the second phase change material;
operating the energy storage apparatus in a storage mode by storing the first phase change material in the first storage vessel and storing the second phase change material as a pressurised vapour in the second storage vessel; and
operating the energy storage apparatus in a discharge mode by vaporising the condensed first phase change material and expanding the vaporised first phase change material in the first expander, and/or expanding the vaporised second phase change material in the second expander.

The step of operating the energy storage apparatus in the charging mode may include energising the heat pump to condense the first phase change material. The step of operating the energy storage apparatus in the storage mode may include storing the condensed first phase change material as a liquid or a solid in the first storage vessel. The step of operating the energy storage apparatus in the charging mode may include energising the heat pump to vaporise the second phase change material.

BRIEF DESCRIPTION OF THE DRAWINGS

Embodiments of the invention are further described hereinafter with reference to the accompanying drawings, in which.

DETAILED DESCRIPTION

Figure 1:
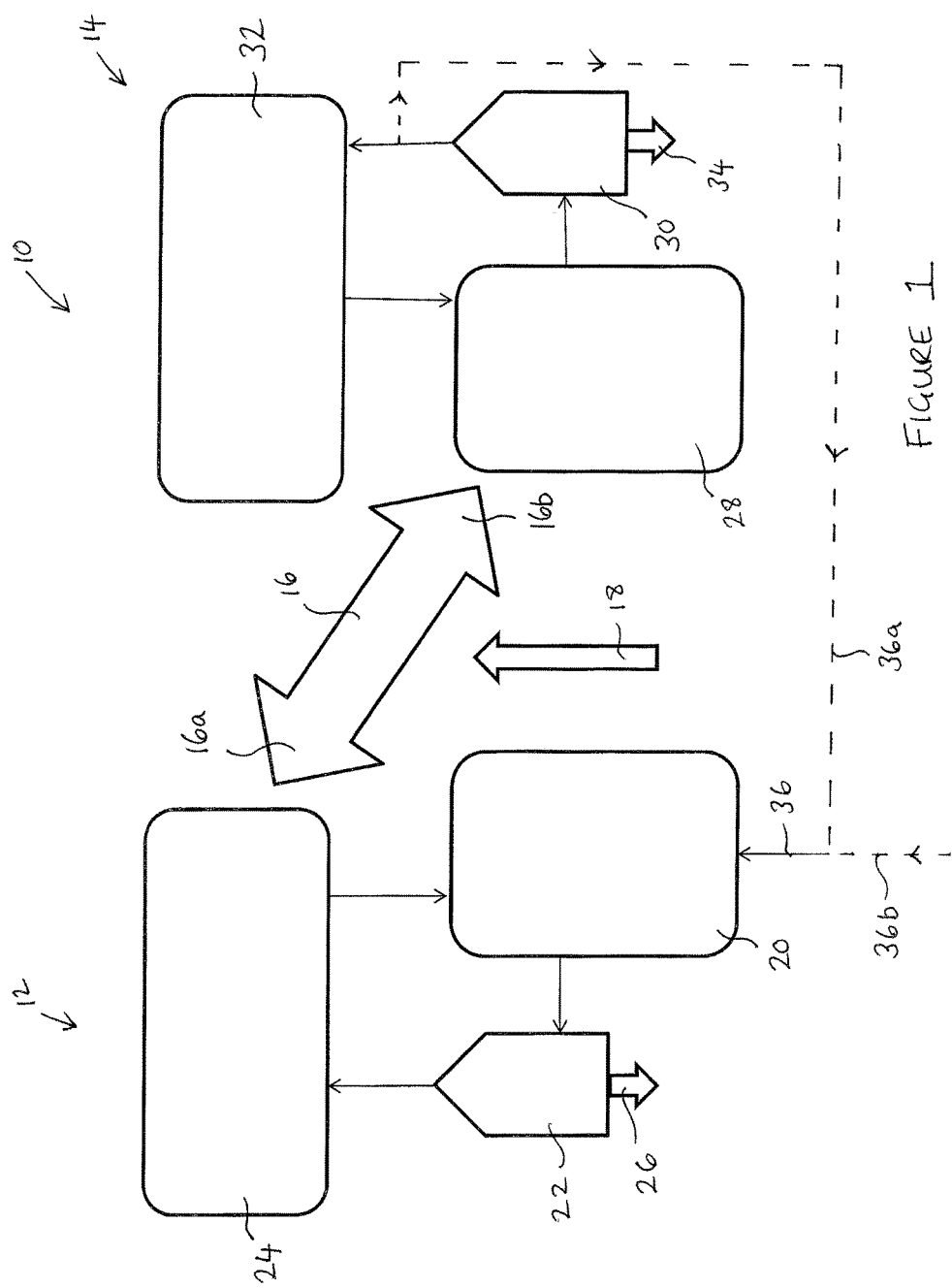
FIG. 1 is a schematic representation of an energy storage apparatus according to an embodiment of the present invention.

An energy storage apparatus 10 in accordance with an embodiment of the present invention is shown schematically in FIG. 1. The energy storage apparatus 10 includes a first fluidic circuit 12, a second fluidic circuit 14, and a heat pump 16.

The first fluidic circuit 12 includes a first storage vessel 20, a first expander 22 and a first vapour volume 24 between an output of the first expander 22 and an input of the first storage vessel 20. The first vapour volume 24 may be a dedicated vessel positioned in the first fluidic circuit 12 or it may simply be a conduit linking the output of the first expander 22 to the input of the first storage vessel 20.

Similarly, the second fluidic circuit 14 includes a second storage vessel 28, a second expander 30 and a second vapour volume 32 between an output of the second expander 30 and an input of the second storage vessel 28. The second vapour volume 32 may be a dedicated vessel positioned in the first fluidic circuit 14 or it may simply be a conduit linking the output of the second expander 30 to the input of the second storage vessel 28.

The first expander 22 and the second expander 30 may each be any suitable apparatus that is capable of expanding a gas to produce mechanical work. In certain embodiments either or each of the first expander 22 and second expander 30 may be an expander generator that expands a gas to produce mechanical work that is subsequently converted into electrical energy. In other embodiments, the mechanical work produced by one or each of the first expander 22 and second expander 30 may be used for other purposes (e.g. mechanically driving another component). Examples of suitable expanders that may be used in accordance with embodiments of the present invention include, but are not limited to, scroll expanders, screw expanders, turbines, turboexpanders, Tesla turbines, reciprocating engines, and pistons.

The heat pump 16 comprises a cold side heat exchanger 16a that is thermally coupled to the first fluidic circuit 12 and a hot side heat exchanger 16b that is thermally coupled to the second fluidic circuit 14.

The first fluidic circuit 12 contains a first phase change material, and the second fluidic circuit 14 contains a second phase change material where the boiling point of the second phase change material is greater than the boiling point of the first phase change material for a given pressure. The first and second phase change materials may each be a material that changes phase in response to a temperature and/or pressure change as the material passes along the respective fluidic circuit 12,14. In particular, in certain embodiments, one or both of the first and second phase change materials may be in the solid phase, liquid phase or gaseous phase at various stages around the respective fluidic circuit 12,14. In other embodiments, one or both of the first and second phase change materials may only be in the liquid phase or gaseous phase at various stages around the respective fluidic circuit 12,14. Suitable and desirable properties of the first and second phase change materials are discussed further below.

The heat pump 16 is energisable, e.g. by electrical energy, through energy input 18 so as to cool the first phase change material held in the first vapour volume 24 and heat the second phase change material in the second storage vessel 28. To optimally achieve this, the cold side heat exchanger 18a of the heat pump 18 may be thermally coupled to the first vapour volume 24 and/or the hot side heat exchanger 16b of the heat pump 16 may be thermally coupled to the second storage vessel 28. Despite initially being in the first vapour volume 24, the first phase change material may be in any state (i.e. solid, liquid or gas) when the heat pump 16 is energized.

Figure 2:
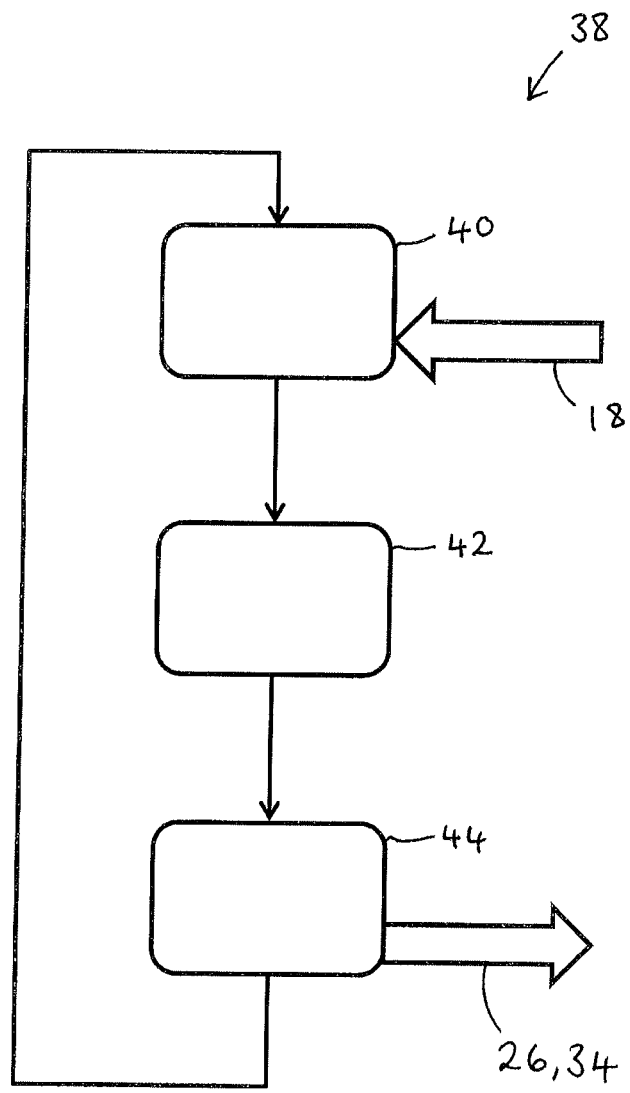
FIG. 2 is a schematic representation of a method of operating an energy storage apparatus in accordance with an embodiment of the present invention.

FIG. 2 shows a schematic representation of a method 38 of operating the energy storage apparatus 10 in accordance with an embodiment of the present invention. As illustrated in FIG. 2, the energy storage apparatus 10 may be operable in three distinct modes, namely a charging mode 40, a storage mode 42, and a discharge mode 44. In certain embodiments, the storage mode 42 may be operational for a short or even instantaneous time period such that the energy storage apparatus 10 may effectively operate in the discharge mode 44 immediately after (or very shortly after) the charging mode 40.

In the charging mode 40, the heat pump 16 is energized (by inputting electrical energy through energy input 18) thereby cooling the first phase change material in the first vapour volume 24. The cooled first phase change material may flow or otherwise travel into the first storage vessel 20 due to gravity. For example, the cooling may cause the first phase change material to condense and/or freeze and travel to the first storage vessel 20. The heat removed from the first phase change material by the heat pump 16 and the heat generated by the heat pump 16 itself cause the second phase change material in the second storage vessel 28 to vaporise (if initially in the solid or liquid phase) and pressurise the second storage vessel 28. In an example where the second phase change material is already in a gaseous phase when the heat pump 16 is energized, the additional heat energy provided by the heat pump 16 will serve to increase the pressure of the second phase change material.

In the storage mode 42, the first phase change material is stored in the first storage vessel 20 and the pressurized and vaporised (i.e. gaseous) second phase change material is stored in the second storage vessel 28. The storage mode 42 may be maintained so as to provide a store of energy when it is not required. The first storage vessel 20 and the second storage vessel 28 are preferably (though not necessarily) insulated so as to reduce thermal (i.e. energy) losses when operating in the storage mode 42. Indeed, the level of insulation will partly determine how long energy may be stored by the energy storage apparatus 10. The first phase change material may be stored in the first storage vessel 20 as a liquid, as a solid, or as a pressurized gas. In certain preferable embodiments, the first phase change material is condensed during the charging mode 40 and subsequently stored as a liquid in the first storage vessel 20. In certain embodiments, first storage vessel 20 may be provided with little or no insulation (or otherwise) such that ambient heat may heat the first phase change material during the storage phase. In such embodiments, the first phase change material may be at or close to working pressure (for expansion) during the storage mode 42.

When output energy (e.g. electrical, energy) is required, the energy storage apparatus 10 may be operated in the discharge mode 44. In the discharge mode 44, the vaporised, gaseous second phase change material stored in the second storage vessel 28 is released through the second expander 30 causing the vaporised second phase change material to be expanded and produce mechanical work at a second energy output 34. The expansion of the second phase change material reduces the pressure and temperature of the second phase change material, however the expanded second phase change material may remain in a gaseous state. In certain embodiments, and for certain expanders in particular, it may be preferable to avoid condensation of the second phase change material in the second expander 22. Indeed, either or both of the first phase change material and second phase change material may be selected such they remain superheated throughout an isentropic expansion across their respective expanders such that they do not condense.

When the energy storage apparatus 10 is operated in the discharge mode 44, the first phase change material stored in the first storage vessel 20 may be allowed to receive heat energy via a thermal energy input 36. For example, if the first phase change material is stored in the first storage vessel 20 in the solid or liquid phase, the thermal energy received through thermal energy input 36 may be used to vaporise the first phase change material (or optionally warmed as a liquid at saturation in the storage mode 42). For the avoidance of doubt, throughout the present specification, the term "vaporise" is intended to relate to the transformation to the vapour (i.e. gaseous) phase either from a solid (i.e. sublimation) or a liquid). As well as being vaporised, the first phase change material may be superheated using ambient or other heat sources. In other embodiments in which the first phase change material is stored in the first storage vessel 20 as a pressurized vapour, the thermal energy received through thermal energy input 36 may be used to increase the pressure of the first phase change material. The thermal energy input 38 may be any feature or component that permits the input of thermal energy into the first phase change material. In the embodiment illustrated in FIG. 1, two non-limiting possibilities are shown. In one example shown in FIG. 1, the thermal energy input includes a first thermal coupling 36a that is arranged to transfer heat from expanded second phase change material exiting the second expander 30 into the first phase change material. In another example shown in FIG. 1, the thermal energy input 36 is configured to transfer thermal energy via a second thermal coupling 36b into the first phase change material. The second thermal coupling 36b may be used to facilitate the input of thermal energy into the first phase change material from the ambient thermal energy or any other thermal energy source. For example, waste heat from an external source may be used to heat the first phase change material via the second thermal coupling 36b. The waste heat may be so-called "low grade waste heat" that may be a by-product from an industrial process. Examples of auxiliary heat sources that may heat the first phase change material (e.g. via the second thermal coupling 36b) may include ambient air sources, ambient water sources (e.g. brine, sea water, brackish water, lakes, ponds, rivers, canals, aqueducts), ground source, geothermal, solar thermal, solar ponds, biologically active heat sources (anaerobic digesters, aerobic digesters, compost heaps, dung heaps, sewage streams, secondary sewage sludges) waste heat from industrial processes, waste, heat from other generation technologies (CCGT, steam turbines etc.). In certain embodiments of the invention, either or both of the first thermal coupling 36a and the second thermal coupling 36b may be used to facilitate heating of the first phase change material. Certain parameters of the first phase change material including the boiling point and the saturated vapour pressure at the expansion temperature (i.e. in the first expander 22) may determine which arrangement may be the most effective.

The first phase change material is subsequently heated until it reaches a target temperature and pressure and the resulting vapour is released through the first expander 22 causing the vaporised first phase change material to be expanded and output energy at a first energy output 26. In embodiments where the first phase change material is stored as a pressurized vapour, the vapourised first phase change material may be released through the first expander 22 without any additional heating. The expansion of the first phase change material in the first expander 22 reduces the pressure and temperature of the first phase change material, however the expanded first phase change material may remain in a gaseous state. In certain embodiments, and for certain expanders in particular, it may be preferable to avoid condensation of the first phase change material in the first expander 22. As noted above, either or both of the first phase change material and second phase change material may be selected such they remain superheated throughout an isentropic expansion across their respective expanders such that they do not condense.

In the discharge mode 44, either or both of the first and second phase change material may be expanded by the respective expander. That is, the discharge mode 44 may be operated independently on the first fluidic circuit 12 or the second fluidic circuit 14, or both of the first and second fluidic circuits 12, 14 concurrently.

After expansion of the first phase change material and the second phase change material, gaseous first phase change material may be (initially, at least) present in the first vapour volume 24 and gaseous second phase change material may be (initially, at least) present in the second vapour volume 32. Over time, the first phase change material and second phase change material may revert to the ambient temperature and pressure. In certain embodiments, vapour volume 24 may be insulated as it may be preferable for the charging mode 40 to commence when the first phase change material is as close to condensing as possible. If the first phase change material is below ambient temperature upon being expanded (e.g. upon exiting an expander), there may be little or no advantage in letting it warm back to ambient. In embodiments where the boiling point of the second phase change material is greater than the ambient conditions, the second phase change material will subsequently condense. In other embodiments, the second phase change material may be actively cooled (e.g. to cause condensation). This active cooling may be achieved by the use of an external cooling source which may be a by-product of an external industrial process or other cooling sources. Examples of auxiliary heating/cooling sources may include ambient air sources, ambient water sources (e.g. brine, sea water, brackish water, lakes, ponds, rivers, canals, aqueducts), ground source, geothermal, solar thermal, solar-ponds, biologically active heat sources (anaerobic digesters, aerobic digesters, compost heaps, dung heaps, sewage streams, secondary sewage sludges) waste heat from industrial processes, waste heat from other generation technologies (CCGT, steam turbines etc.). In certain embodiments, the first vapour volume 24 may be thermally coupled to the second vapour volume 32 so that heat may be transferred from the hotter second phase change material to the first phase change material thereby accelerating cooling of the second phase change material. Cooled second phase change material, which may be gaseous, condensed (i.e. liquid), or frozen (solid), may be moved (e.g. under gravity or other means) to the second storage vessel 28 to complete the full operation cycle of the energy storage apparatus 10. The energy storage apparatus 10 may then be operated once again in the charging mode 40 to repeat the cycle.

As noted above, additional heating or cooling may be applied to the first fluidic heat circuit 12 and/or second fluidic heat circuit 14. In particular, additional heating or cooling from external sources (e.g. from external industrial processes) may be applied to any one or more of the first storage vessel 20, the second storage vessel 28, the first vapour volume 24, and the second vapour volume 32.

Each of the first fluidic circuit 12 and second fluidic circuit 14 is a closed fluidic circuit such that the first phase change material is not fluidly connected to the second phase change material. However, as noted above, thermal transfer between the first fluidic circuit 12 and the second fluidic circuit 14 is permitted (e.g. via the heat pump 16 and the optional thermal coupling 36a).

Either or both of the. first storage vessel 20 and the second storage vessel 28 may be configured to change volume (e.g. like a gasometer) so as to maintain any first phase change material or second phase change material, respectively, at a substantially constant pressure. In other embodiments, either or both of the first storage vessel 20 and the second storage vessel 28 may be otherwise configured to maintain the first phase change material or second phase change material at a constant pressure as it enters the first expander 22 or second expander 30. respectively, For example, either or both of the first storage vessel 20 and the second storage vessel 28 may be pressurized to achieve such an effect.

Any suitable materials may be used for the first phase change material and the second phase change material provided that the second phase change material has a higher boiling point than the first phase change material at a given pressure (that falls within the range of working pressures of the present invention). The skilled reader will appreciate that there may be pressures outside of the working pressures of the present invention (e.g. very low pressures) at which the second phase change material may not have a higher boiling point than the first phase change material. However, references to the boiling points of either or both of the first and second phase change materials throughout the present specification are to be understood to relate to boiling points at a pressure within the working pressure range of the present invention.

In certain embodiments, the first phase change material and the second phase change material may be selected so that the apparatus 10 may operate at temperatures and pressures that may permit the apparatus 10 to be constructed of low cost materials. In certain embodiments, the first phase change material may be the same material as the second phase change material provided that the pressures of the first fluidic circuit 12 and second fluidic circuit 14 are actively controlled. In certain embodiments, the operating temperature of the apparatus 10 may be within the range −150° C. to +150° C. In certain embodiments, the operating pressure of the apparatus 10 may be less than 25 bar.

In certain embodiments, the first phase change material may have a boiling point less than 50° C. or 40° C. In such embodiments, the first phase change material may be vaporised by ambient temperature (e.g. where "ambient temperature" is considered to be between −20° C. and 50° C. or between 10° C. and 40° C.). In certain embodiments, the boiling point of the first phase change material may be sufficiently below ambient temperature such that at ambient temperature the first phase change material has a vapour pressure in excess of 1 bar and less than 25 bar. Such embodiments may permit the use of low cost materials for the construction of the apparatus 10.

The first phase change material may have a boiling point that is below (possibly significantly below) ambient temperature. In certain embodiments, the first phase change material has a boiling point less than 25° C. at 1 bar, or less than 20° C. at 1 bar, or less than 0° C. at 1 bar, or less than −10° C. at 1 bar.

In certain embodiments, the second phase change material may have a condensation temperature that is less than 50° C. or 40° C. In such embodiments, the second phase change material may be condensed by ambient temperature (e.g. where "ambient temperature" is considered to be between −20° C. and 50° C. or between 10° C. and 40° C.), In certain embodiments, the second phase change material may be a vapour at the operating pressure of the apparatus 10. For example, at an operating temperature that is less than 150° C., the second phase change material may be selected to be one that has a vapour pressure in excess of 1 bar and less than 25 bar. Such embodiments may permit the use of low cost materials for the construction of the apparatus 10.

The second phase change material may have a boiling point that is above (and possible significantly above) ambient temperature. In certain embodiments, the second phase change material has a boiling point greater than 20° C. at 1 bar, or greater than 25° C. at 1 bar, or greater than 30° C. at 1 bar. In certain embodiments, it may be preferable for the difference between the condensation temperature of the second phase change material and the boiling point of the first phase change material to be small. For example, in certain embodiments the difference between the condensation temperature of the second phase change material and the boiling point of the first phase change material may be less than 200° C., and in certain embodiments may be between 10° C. and 200° C.

Assuming maximum theoretical efficiency, the coefficient of performance (CoP) of the heat pump 16 may be defined as:

$$CoP_{Heating} = T_{Hot}/(T_{Hot} - T_{Cold}),$$

where $T_{Cold}$ and $T_{Hot}$ are the target temperatures of the cold and hot reservoirs, respectively (i.e. the first phase change material and second phase change material, respectively). In an example where $T_{Cold}$=244° K (−29° C.) and $T_{Hot}$=358° K (85° C.), $CoP_{Heating}$=3.140. In certain embodiments, the value of $CoP_{Heating}$ is preferably as high as possible, and the first phase change material and second phase change material may be selected to achieve a high value of $CoP_{Heating}$. Energy storage apparatuses according to embodiments of the present invention may offer a commercially viable means for storing energy when demand for energy (such as electrical energy) may be low, where acceptably low losses may be incurred between charging the apparatus and discharging the apparatus. Energy storage apparatuses in accordance with embodiments of the present invention may be operated at low or moderate temperatures in contrast to very high or very low temperature systems found in the prior art. Furthermore, energy storage apparatuses in accordance with embodiments of the present invention may be operated using small temperature differences in contrast to prior art arrangements. Consequently, energy storage apparatuses in accordance with certain embodiments of the present invention may be produced using largely standard and inexpensive equipment. Energy storage apparatuses in accordance with embodiments of the present invention are scalable such that they may be used for large or small scale energy storage, waste heat recovery, and low grade waste heat recovery. Energy storage apparatuses in accordance with certain embodiments of the present invention may be particularly suited to operating in the discharge mode 44 once or twice per day.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An energy storage apparatus comprising:
   a first fluidic circuit containing a first phase change material, the first fluidic circuit including a first storage vessel and a first expander;
   a second fluidic circuit containing a second phase change material having a boiling point greater than a boiling point of the first phase change material, the second fluidic circuit including a second storage vessel and a second expander; and
   a heat pump having a cold side heat exchanger thermally coupled to the first fluidic circuit and a hot side heat exchanger thermally coupled to the second fluidic circuit,
   the apparatus being operable in a charging mode, a storage mode following the charging mode, and a discharge mode following the storage mode;
   wherein in the charging mode the heat pump is energized to cool the first phase change material and heat the second phase change material;
   in the storage mode the first phase change material is stored in the first storage vessel and the second phase change material is stored as a pressurized vapor in the second storage vessel; and
   in the discharge mode vaporized first phase change material is expanded by the first expander, or the vaporized second phase change material is expanded by the second expander.

2. The apparatus of claim 1, wherein the first fluidic circuit is arranged such that in the discharge mode or storage mode the first phase change material may be heated by ambient thermal energy or other auxiliary heat sources.

3. The apparatus of claim 2, wherein the first fluidic circuit is arranged such that in the discharge mode or storage mode the first phase change material may be vaporized by ambient thermal energy or other auxiliary heat sources.

4. The apparatus of claim 1, further comprising a thermal coupling arranged to transfer heat from expanded second phase change material to the first phase change material and cause the first phase change material to vaporize or be further heated.

5. The apparatus of claim 1, wherein in the charging mode, the heat pump is energized to condense the first phase change material.

6. The apparatus of claim 5, wherein in the storage mode the condensed first phase change material is stored as a liquid or a solid.

7. The apparatus of claim 1, wherein the first phase change material has a boiling point less than 40° C. at 1 bar.

8. The apparatus according to claim 7, wherein the first phase change material has a boiling point less than 0° C. at 1 bar.

9. The apparatus according to claim 7, wherein the first phase change material has a boiling point less than −10° C. at 1 bar.

10. The apparatus of claim 1, wherein the second phase change material has a boiling point less than 40° C. at 1 bar.

11. The apparatus of claim 1, wherein the second phase change material has a boiling point greater than 20° C. at 1 bar.

12. The apparatus according to claim 11, wherein the second phase change material has a boiling point greater than 25° C. at 1 bar.

13. The apparatus according to claim 12, wherein the second phase change material has a boiling point greater than 30° C. at 1 bar.

14. The apparatus of claim 1, wherein the first storage vessel is configured to change volume so as to maintain the first phase change material at a substantially constant pressure.

15. The apparatus of claim 1, wherein the second storage vessel is configured to change volume so as to maintain the second phase change material at a substantially constant pressure.

16. The apparatus of claim 1, wherein one or each of the first expander and second expander comprises an expander generator.

17. A method of operating an energy storage apparatus that includes first and second fluidic circuits and a heat pump; where the first fluidic circuit includes a first phase change material, a first storage vessel and a first expander; the second fluidic circuit includes a second phase change material, a second storage vessel and a second expander; the second phase change material having a boiling point greater than a boiling point of the first phase change material; and the heat pump having a cold side heat exchanger thermally coupled to the first fluidic circuit and a hot side heat exchanger thermally coupled to the second fluidic circuit; the method comprising:

operating the energy storage apparatus in a charging mode by energizing the heat pump to cool the first phase change material and heat the second phase change material;

operating the energy storage apparatus in a storage mode by storing the first phase change material in the first storage vessel and storing the second phase change material as a pressurized vapor in the second storage vessel; and operating the energy storage apparatus in a discharge mode by vaporizing condensed first phase change material and expanding the vaporized first phase change material in the first expander, or expanding the vaporized second phase change material in the second expander.

18. The method according to claim 17, wherein the step of operating the energy storage apparatus in the charging mode includes energizing the heat pump to condense the first phase change material.

19. The method according to claim 18, wherein the step of operating the energy storage apparatus in the storage mode includes storing the condensed first phase change material as a liquid or a solid in the first storage vessel.

20. The method according to claim 17, wherein the step of operating the energy storage apparatus in the charging mode includes energizing the heat pump to vaporize the second phase change material.

\* \* \* \* \*